(No Model.) 6 Sheets—Sheet 1.

H. H. CUMMINGS.
SEWING MACHINE.

No. 447,008. Patented Feb. 24, 1891.

WITNESSES.
Robert Wallace
C. E. Nolte

INVENTOR.
Henry H. Cummings,
by Wm. A. Macleod.
his atty (No Model.)　　　　　　H. H. CUMMINGS.　　　6 Sheets—Sheet 2.
SEWING MACHINE.

No. 447,008.　　　　　　　　Patented Feb. 24, 1891.

WITNESSES
Robert Wallace
C. E. Nolte

INVENTOR
Henry H. Cummings,
by Wm. A. Macleod
his Atty (No Model.) 6 Sheets—Sheet 3.

H. H. CUMMINGS.
SEWING MACHINE.

No. 447,008. Patented Feb. 24, 1891.

WITNESSES.
Robert Wallaer.
C. E. Nolte

INVENTOR.
Harry H. Cummings,
by Wm A. Macleod
his Atty

THE NORRIS PETERS CO., PHOTO-LITHO., WASHINGTON, D. C.

(No Model.)  6 Sheets—Sheet 4.

H. H. CUMMINGS.
SEWING MACHINE.

No. 447,008.  Patented Feb. 24, 1891.

WITNESSES
Robert Wallace
C. E. Nolte

INVENTOR
Henry H. Cummings,
by Wm. A. Macleod
his atty (No Model.) 6 Sheets—Sheet 5.

H. H. CUMMINGS.
SEWING MACHINE.

No. 447,008. Patented Feb. 24, 1891.

WITNESSES
Robert Wallace,
C. E. Nolte

INVENTOR
Henry H. Cummings,
by Wm. A. Macleod,
his atty (No Model.) 6 Sheets—Sheet 6.

H. H. CUMMINGS.
SEWING MACHINE.

No. 447,008. Patented Feb. 24, 1891.

Fig. 10.  Fig. 11ᵃ.  Fig. 11.

WITNESSES.
Robert Wallace.
C. E. Nolte.

INVENTOR.
Henry H. Cummings,
by Wm. A. Macleod,
his Atty.

UNITED STATES PATENT OFFICE.

HENRY H. CUMMINGS, OF MALDEN, ASSIGNOR TO THE DAVIS-MOORE SEWING MACHINE COMPANY, OF BOSTON, MASSACHUSETTS.

SEWING-MACHINE.

SPECIFICATION forming part of Letters Patent No. 447,008, dated February 24, 1891.

Application filed March 26, 1890. Serial No. 345,432. (No model.)

*To all whom it may concern:*

Be it known that I, HENRY H. CUMMINGS, of Malden, in the county of Middlesex and State of Massachusetts, have invented a new and useful Improvement in Sewing-Machines, of which the following, taken in connection with the accompanying drawings, is a specification.

My invention has for its object to provide an improved lock-stitch wax-thread sewing-machine which shall be simple and compact in construction and strong and positive in operation; and to this end my invention comprises certain novel combinations of parts, as will be hereinafter indicated by the claims hereunto appended.

Figure 1:
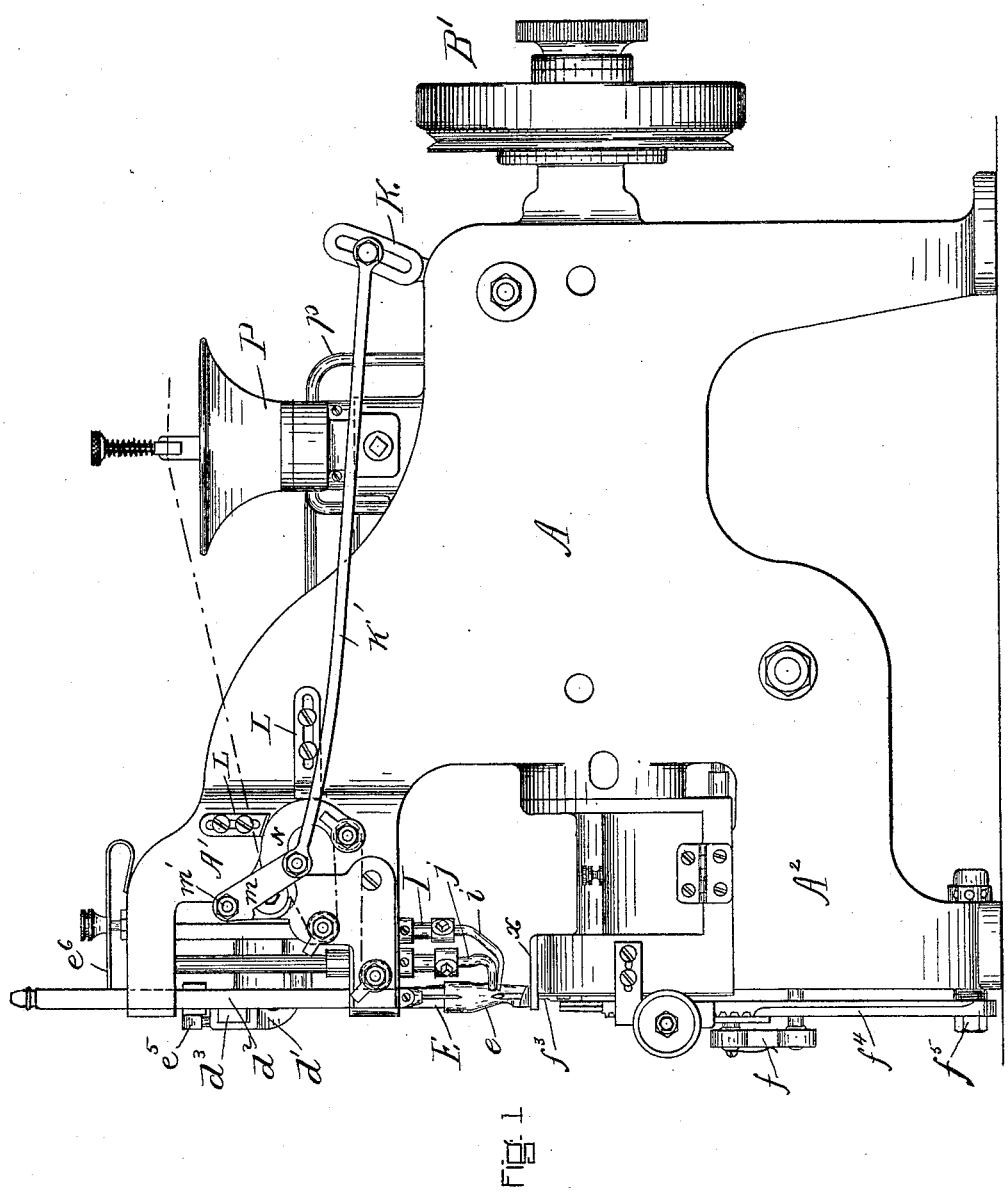
Figure 2:
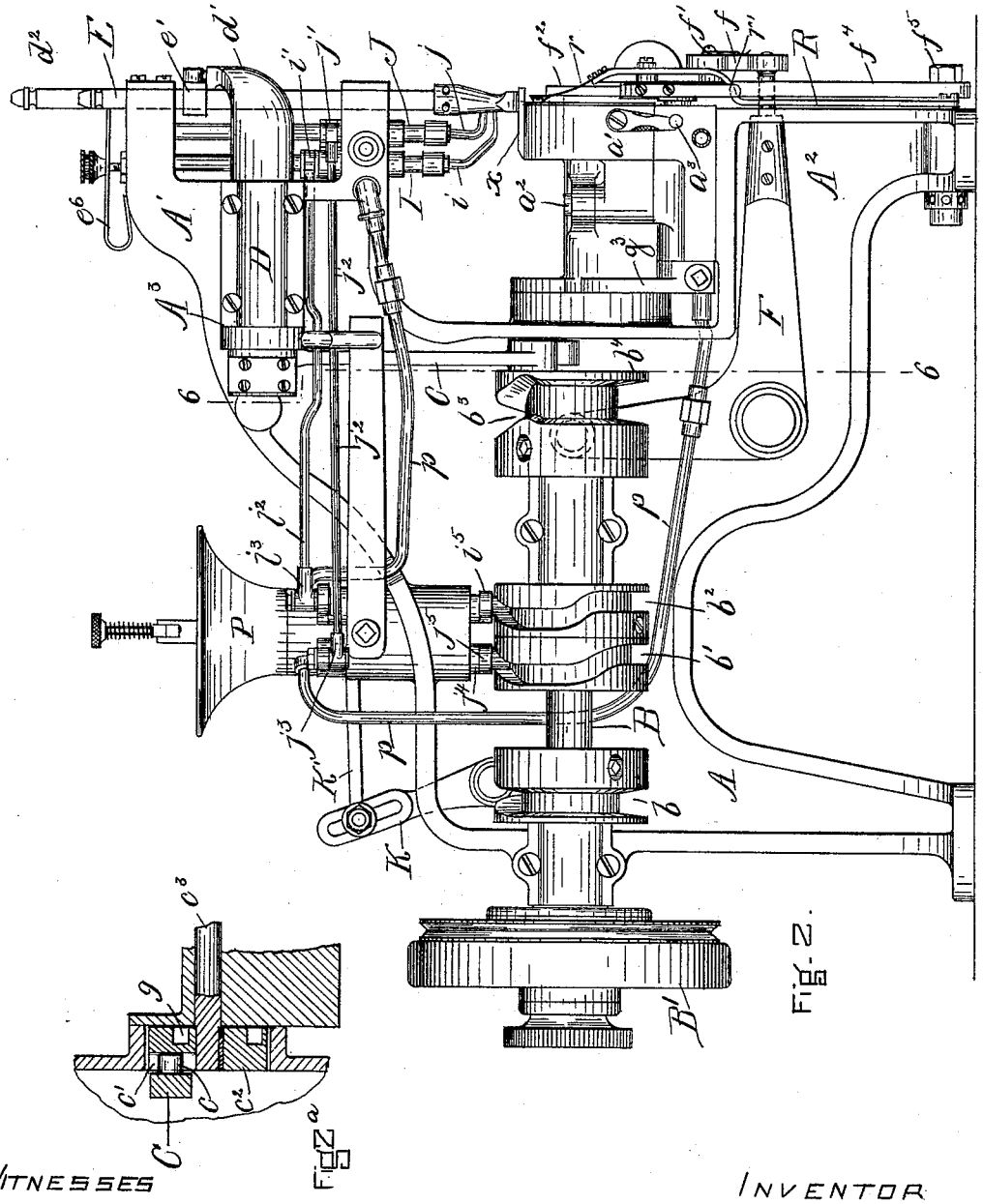
Figure 3:
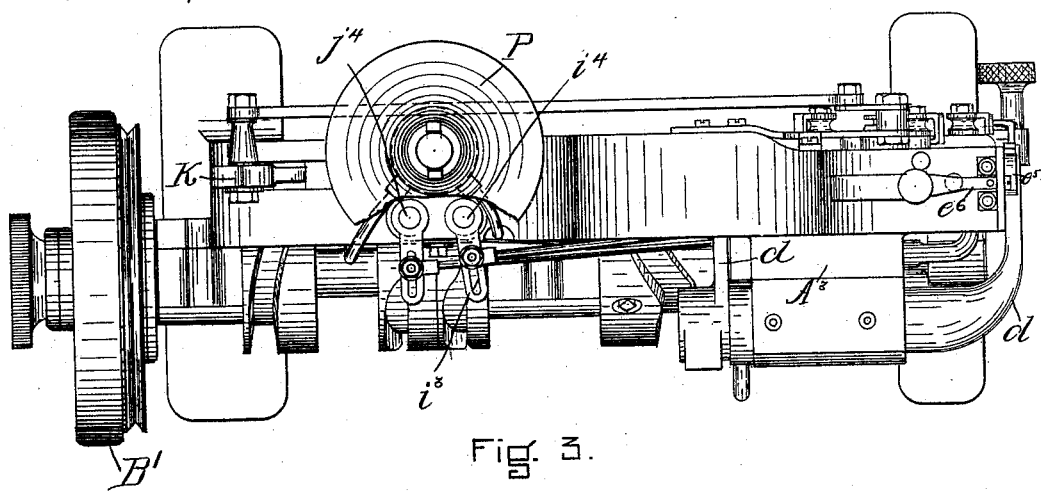
Figure 4:
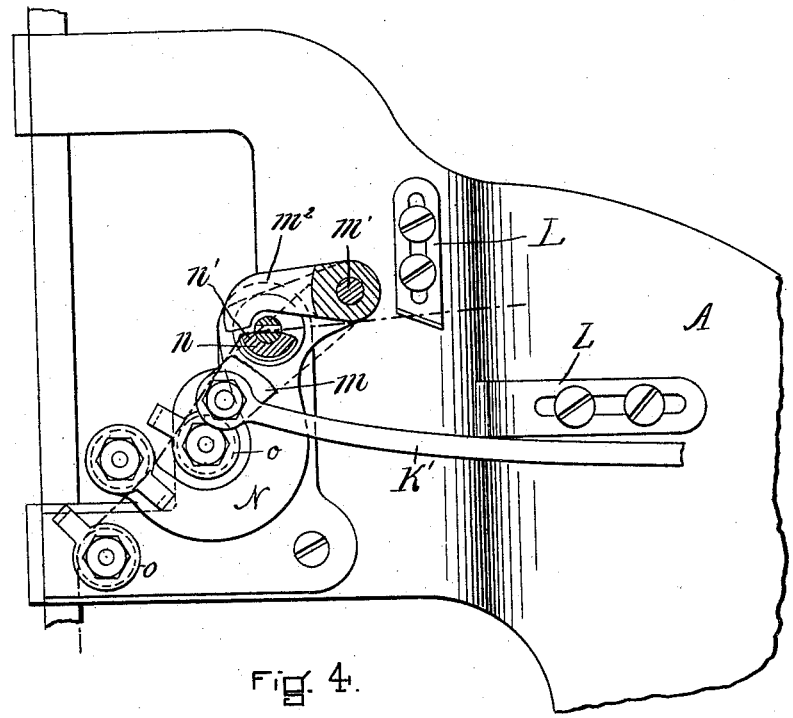
Figures 5, 6:
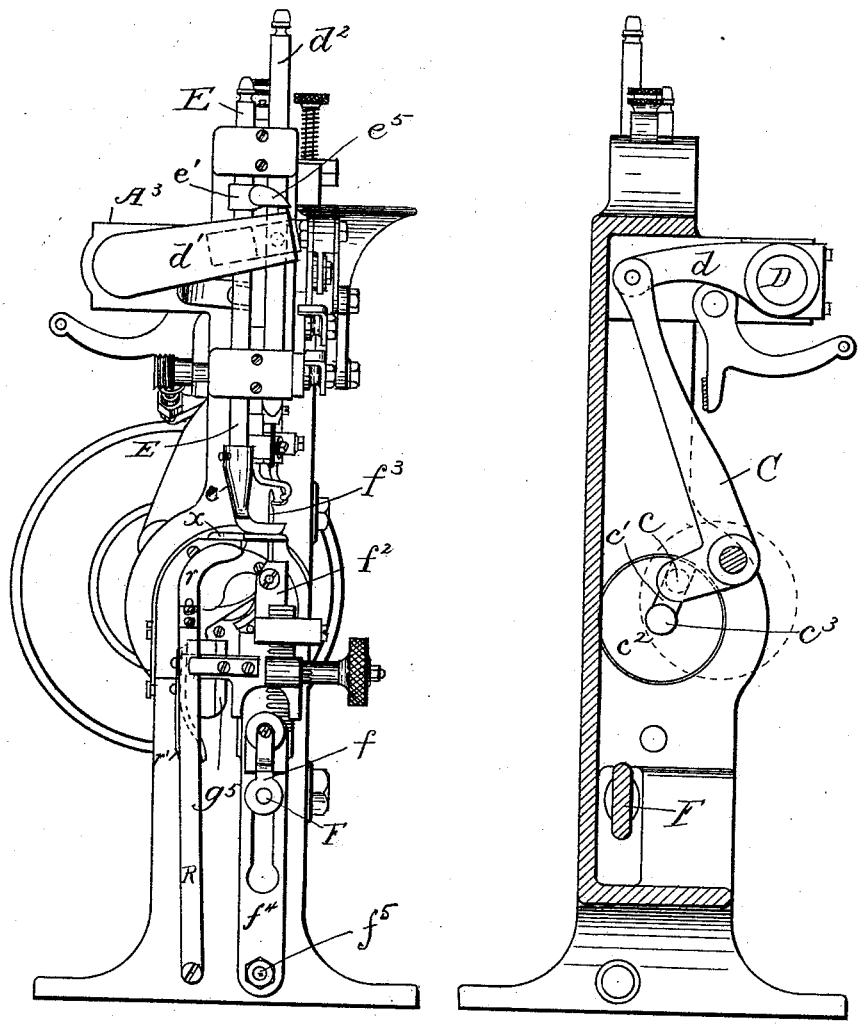
Figures 7, 8:
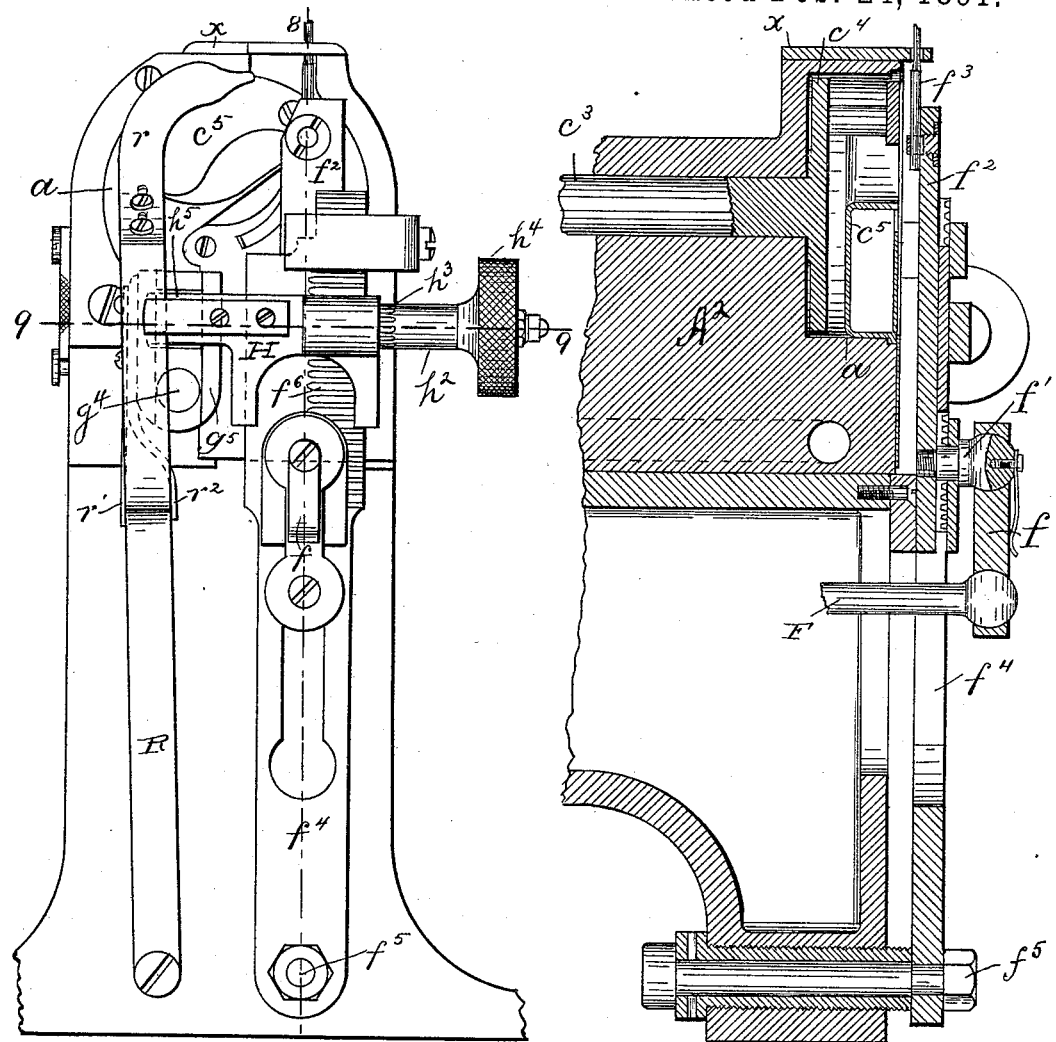

In the accompanying drawings, Figures 1 and 2 are opposite side elevations of my improved machine. Fig. $2^a$ is a sectional detail showing the connection of the shuttle-operating shaft with the driving-shaft. Fig. 3 is a plan view of the machine. Fig. 4 is a detail view to illustrate the take-up. Fig. 5 is a front end elevation of the machine. Fig. 6 is a vertical section on line 6 6 of Fig. 2. Fig. 7 is a detail front view of the lower part of the machine. Fig. 8 is a vertical section of the same on line 8 8 of Fig. 7, and Fig. 9 a cross-section on line 9 9 of Fig. 7. Figs. 10, 11, $11^a$, 12, and 13 are detail views to be referred to.

A denotes the frame of the machine, forked at its forward end to form the branches A' A², on or in which the upper and lower stitch-forming devices are located, the work-receiving space being between these branches.

B is the driving-shaft, located at or near the middle of the frame A vertically and provided with a driving-pulley B' and cams $b$, $b'$, $b^2$, and $b^3$, these cams serving to impart movement to the take-up, thread-guide or thread-carrier, thread-measurer, and needle, as will hereinafter appear.

To the front face of the disk $b^4$ of the cam $b^3$ is pivotally attached a bell-crank lever C, having in its shorter arm a pin $c$, working in a slot $c'$ of a disk $c^2$ on the rear end of a shuttle-operating shaft $c^3$, the latter having at its forward end a shuttle-driver $c^4$, housed in a recess $a$ in the lower branch A² of the frame A, said recess also receiving the shuttle $c^5$, for which the walls of said recess serve as a race. The shaft $c^3$ is out of line with the driving-shaft B, being below the latter, and by means of the above-described connection with the driving-shaft it receives a differential rotary movement therefrom in a well-known manner, so that the shuttle will move at varying speeds at different parts of its rotation.

A portion of the shuttle-race is in the form of a removable cover $a'$, pivoted at $a^2$ and secured by a latch $a^3$, so that it may be swung aside for the insertion or removal of the shuttle, and the latter is or may be substantially the same as the shuttle shown and described in United States Patents Nos. 353,252, 353,253, and 353,255, granted to Job A. Davis, dated November 23, 1886.

The bell-crank lever C is attached at its upper end to an arm $d$ of a rock-shaft D, journaled in a bracket A³ and having at its forward end the arm $d'$, connected with the awl-bar $d^2$ through the stud or block $d^3$, received in a groove in said arm $d'$, so that the said awl-bar and the awl carried thereby will be reciprocated vertically as the said shaft is rocked.

E is the presser-bar carrying the foot $e$, resting on the work-plate $x$, and $e'$ is a collar or sleeve surrounding said bar, the latter being normally free to move upward through said sleeve to accommodate different thicknesses of work beneath the presser-foot. The sleeve $e'$ is carried by a bar $e^2$, splined into the presser-bar, as shown in Fig. 10, and provided with a small bracket $e^3$, carrying a rocking cam $e^4$, provided with a tappet or toe-piece $e^5$, arranged in the path of the arm $d'$ of the rock-shaft D, so that at the proper intervals the engagement of the said arm with the said tappet or toe-piece will first cause the said presser-bar to be gripped in the sleeve $e'$, and the further upward movement of the said arm will then lift the presser-foot to permit the work to be fed by the needle, as will be hereinafter explained. The presser-bar is depressed by the spring $e^6$.

F is the needle-operating lever, the vertical arm of which is provided with a stud or roller entering the groove of the cam $b^3$ on the shaft B, the forward end of the horizontal arm of said lever being connected through the link $f$ and stud $f'$ with the needle-bar $f^2$, carrying the hooked needle $f^3$ and sliding vertically in the lever $f^4$, pivoted at $f^5$ to the frame A. The link $f$ has universal-joint connections with the lever F and stud $f'$, as shown more clearly in Fig. 8, to permit of free movements of the parts as the needle-bar and needle are moved vertically in sewing and horizontally in feeding.

Figure 9:
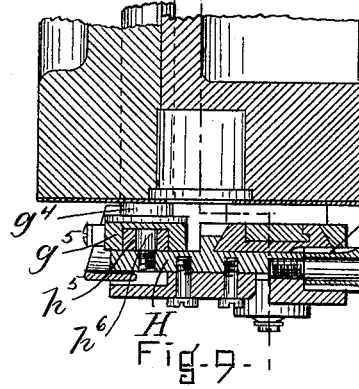
Figure 12:
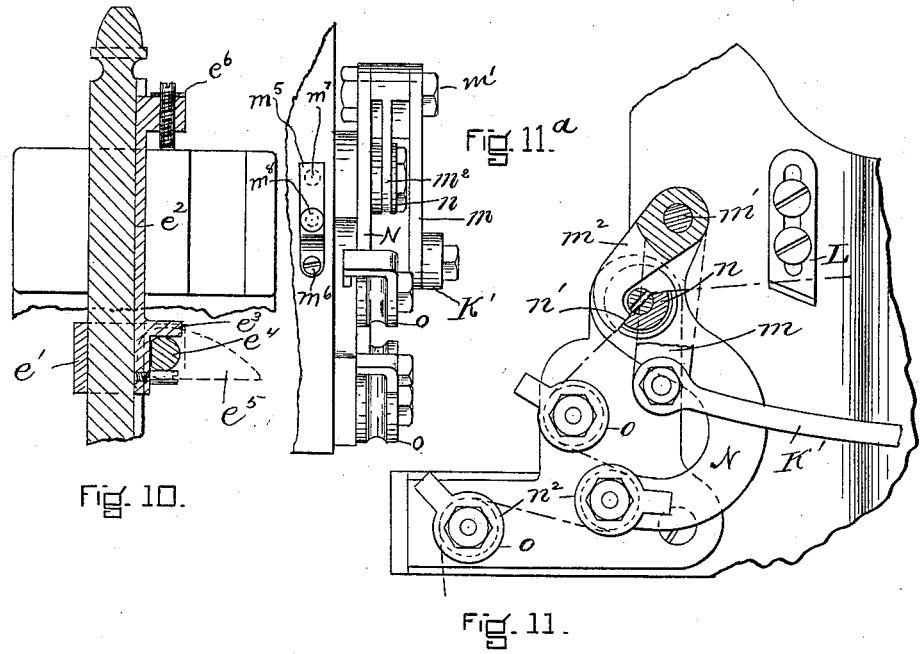
Figure 13:
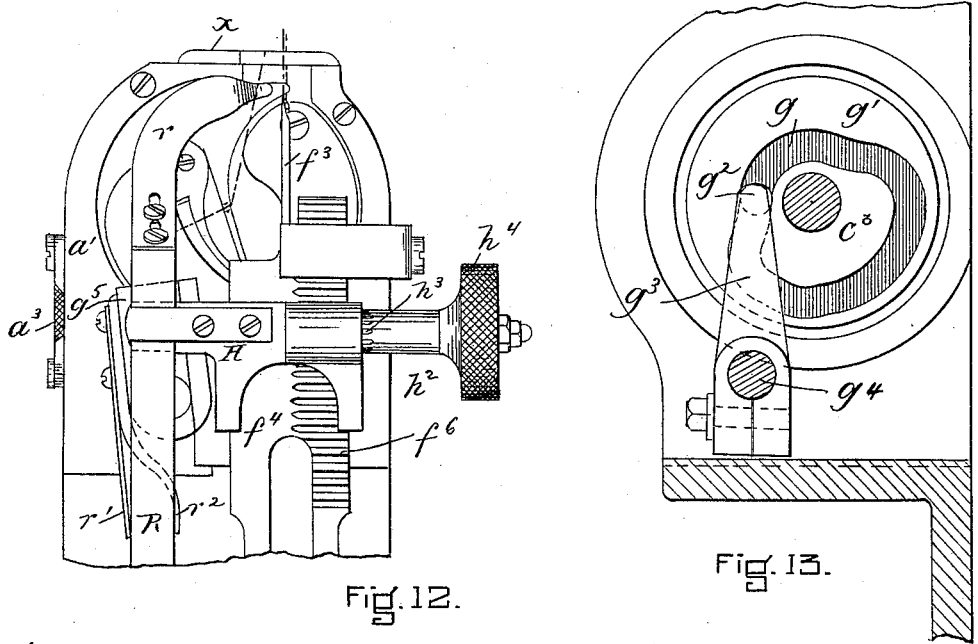

The horizontal movements of the needle-bar and needle are derived from the cam-groove $g$ in the disk $g'$ on the shuttle-driving shaft $c^3$, said cam-groove being entered by a stud or roller $g^2$ at the upper end of an arm $g^3$ on the rear end of a rock-shaft $g^4$, Figs. 9 and 13, said shaft having at its forward end a grooved arm $g^5$, receiving a slide $h^5$ on a stud $h^6$, attached to a cross-bar or block H, vertically adjustable on the lever $f^4$ and carrying a rod $h'$, on which is journaled a small shaft or sleeve $h^2$, having a toothed portion $h^3$ engaging a rack $f^6$ on the lever $f^4$ and provided at its outer end with a turning handle or head $h^4$. By turning the said handle or head the cross-bar or block H may be raised or lowered on the lever $f^4$, the slide $h^5$ moving vertically in the grooved arm $g^5$ of the rock-shaft $g^4$, thus varying the horizontal or feeding movements of the needle-bar and needle, as will be readily understood. The lateral or feeding movement of the needle is of course timed to occur when the needle is raised or in the work, as is usual in machines of this kind.

I is a vertical rock-shaft at the front end of the machine and carrying at its lower end a take-up or thread measuring or feeding arm $i$, slightly curved at its forward end, so as to catch the thread after it passes the thread-carrier $j$ and engage the thread while the thread-carrier places the thread in the hook of the needle. The said arm $i$ operates to take up a sufficient amount of the slack thread when the needle is up and give it to the needle as the needle moves down, thus preventing the thread from rendering through the eye of the needle and the consequent chafing of the thread. The thread-measuring shaft I has an upper or operating arm $i'$, connected by a rod $i^2$ with the upper arm $i^3$ of a vertical shaft $i^4$, Fig. 3, journaled in the frame A, and having a lower arm $i^5$, provided with a stud or roller entering the groove of the cam $b^2$ on the driving-shaft B.

The thread-carrier or thread-guide $j$, which at proper intervals presents the thread to the hooked needle $f^3$, is attached to a vertical rock-shaft J, having an upper or operating arm $j'$ connected by the rod $j^2$ with the upper arm $j^3$ of a vertical rock-shaft $j^4$, the latter having at its lower end an arm $j^5$, carrying a stud or roller $j^6$, entering the groove of the cam $b'$ of the shaft B. The upper arms of the shafts $j^4$ $i^4$ are preferably slotted, as shown in Fig. 3, so that the movements of the thread-carrier and thread-measurer may be varied as may be necessary or desirable.

K is the take-up-operating lever, operated by the cam $b$ on the shaft B, and K' is a connecting-rod adjustably secured to the upper end of said lever and attached at its forward end to a swinging arm $m$, Figs. 1, 4, 11, and 11ᵃ, pivoted on the pin $m'$. Rigid with the arm $m$ is a second arm $m^2$, entering the groove of a disk or jaw $n$, carried by the take-up lever N, which latter is also pivoted or fulcrumed on the pin $m'$, which has a bearing in the frame. The grooved jaw $n$ has a central pin or portion preferably provided with a hole, Figs. 4 and 11, through which the thread passes, and forward of said hole is a bearing portion at $n'$, over which the thread passes, and which or the thread therein the free end of the arm $m^2$ impinges to operate the take-up lever, the latter, it being understood, being entirely disconnected at its fulcrum on the pin $n'$ from the arms $m$ and $m^2$. Thus when the connecting-rod K' begins to move backward the free end of the arm $m^2$ is first pressed on the thread lying on the bearing portion $n'$ of the jaw $n$, thereby clamping the thread, and as the said arm continues its downward and backward movement it forces the take-up lever backward to draw up the thread and tighten the stitch. As the movements of the take-up lever are thus derived from the thread-clamping arm it will be apparent that the greater the resistance or the harder the pull of the take-up on the thread the tighter the latter will be clamped between the bearing portion $n'$ of the jaw $n$ and the end of the arm $m^2$.

The take-up lever is preferably provided at its lower or free end with a roller $n^2$, around which the thread passes, and resistance-rollers $o$ on stationary axes are also preferably used in co-operation with the take-up.

By providing the upper end of the take-up-operating lever K with a slot, so that the connection of the rod K' therewith may be changed, the throw of the take-up may be varied, as may be desired. Adjustable stops L, attached to the arm or frame A and serving to prevent overthrowing of the take-up lever, are preferably employed. The forward movements of the take-up lever are effected by the draft of the thread when the arm $m^2$ is raised or swung away from the bearing portion $n'$ of the roller $n$, while the backward or take-up movements of said lever, derived from the arm $m^2$, are positive.

It will be understood that the arms $m$ and $m^2$, which are pivoted at $m'$, are rigid relative to each other and always move together. They are rigidly secured together by pins, which are not shown. These arms are pivoted at $m'$ to the upper end of the take-up lever, while the whole device is pivoted to the frame by a pivot which has the same axis as the disk or jaw $n$, and which works in an aperture or bearing in the frame. This pivot works under tension, a tension-spring $m^5$ being provided, which is secured at its lower end to the front of the frame at $m^6$, and which is provided near its upper end with a pin $m^7$, which projects through the frame and bears on the stud or pivot. An adjusting-screw $m^8$ is provided, by means of which the pressure of the spring $m^5$ may be adjusted.

P denotes the wax-pot, which is heated by steam passing through pipes $p$, the stitch-forming devices being also kept warm by the steam circulating in proximity thereto in the said pipes and in apertures in the frame of the machine, and into which the said pipes open.

In the operation of my improved machine the needle ascends through the work on the work-plate $x$, the hole for the needle having first been made by the awl, and while the needle is in the work it is moved laterally to feed the same, the presser-foot being at this moment lifted. While the needle is above the work the thread is laid in its hook by the thread-carrier. As the needle descends the necessary thread is allowed to pass down with it by reason of the return movement of the thread-measurer, and neither the movement of the needle nor that of the thread-measurer draws any new thread from the wax-pot. The shuttle then enters the loop, and in increasing the size of the loop as it passes through it draws a new portion of the thread from the wax-pot. The movement of the shuttle through the loop is substantially the same as is described in the patents hereinbefore referred to. The clamping take-up then operates to set the stitch, which is drawn up very tightly. As the shuttle draws the amount of thread necessary for each stitch from the wax-pot, it will be seen that its action is automatic and that whether the work be thick or thin or the feed long or short only so much thread will be drawn off as is required for each stitch—that is, the amount of thread drawn off is varied automatically, according to the thickness of the work and length of stitch, and the thickness of the work and length of stitch are made the gage by which the requirement of thread is measured. The spring $r$ on the vibrating lever R, operated by the arms $r'$ $r^2$, attached to the forward arm $g^5$ of the rock-shaft $g^4$, serves to prevent the shuttle-thread from passing behind the shuttle. This feature, however, is not of my invention.

Having thus described my invention, I claim and desire to secure by Letters Patent—

1. In a wax-thread sewing-machine, the combination, with the frame A, forked at its forward end to form the branches A' A², having a work-receiving space between them, of the driving-shaft B, journaled in the rear portion of the said frame about midway vertically thereof and provided with the cams $b$ $b'$ $b^2$ $b^3$, the rotating shuttle-operating shaft $c^3$ forward of the said driving-shaft and connected therewith to receive a differential rotary movement therefrom, as described, the needle-bar and its needle, the bell-crank lever F, actuated by the said cam $b^3$ and serving to operate said needle-bar, the take-up lever N, the lever K, operated by the said cam $b$, the connecting-rod K' between the said lever K and the take-up lever, the vibrating thread-carrier $j$, the vibrating thread-measurer $i$, and connections between the said cams $b'$ and $b^2$ and the thread-carrier and thread-measurer, substantially as described.

2. The combination, with the driving-shaft B, having the disk $b^4$, of the bell-crank lever C, pivoted to said disk and having its shorter arm provided with a pin $c$, the shuttle-operating shaft $c^3$, having the disk $c^2$, provided with the slot $c'$, entered by the said pin $c$, the rock-shaft D, having the rear arm $d$, to which the longer arm of said bell-crank lever is attached, and the forward arm $d'$, and the awl-bar $d^2$, operatively connected with the said bar $d'$.

3. The combination, with the driving-shaft B, having the cam $b^3$, of the bell-crank needle-bar-operating lever F, the vertical arm of which is provided with a stud entering the groove of said cam, the lever $f^4$, the needle-bar constructed to slide vertically in said lever, a link having universal-joint connections with said needle-bar and lever, the rock-shaft $g^4$, having arms $g^3$ and $g^5$, the grooved cam for operating said rock-shaft, and connections between the said arm $g^5$ and said lever $f^4$, whereby the latter is vibrated to impart horizontal feeding movements to said needle-bar.

4. The combination, with the lever $f^4$, having the rack $f^6$, of the needle-bar sliding vertically in said lever, the cross-bar or block H, the regulating sleeve or shaft $h$, supported by said block or cross-bar and having a toothed portion engaging said rack, a turning head or handle, and a stud or slide, and the rock-shaft $g^4$, having a slotted arm engaging said stud or slide.

5. The combination, with the shaft $c^3$, having the cam-grooved disk $g'$, of the lever $f^4$, the needle-bar sliding vertically therein, the rock-shaft $g^4$, having arms $g^3$ and $g^5$, and the cross-bar or block H, connected with said arm $g^5$ and vertically adjustable on said lever $f^4$.

6. The combination, with the needle and shuttle and their operating mechanisms, of the vertical rock-shaft I, having the thread-measurer arm $i$ and operating-arm $i'$, the connecting-rod $i^2$, the vertical shaft $i^4$, having arms $i^3$ and $i^5$, to the former of which said rod is attached and the latter of which has a stud or roller $i^6$, the grooved cam $b^2$, entered by said stud or roller, and the shaft B, carrying said cam.

In testimony whereof I have signed my name to this specification, in the presence of two subscribing witnesses, on this 18th day of March, A. D. 1890.

HENRY H. CUMMINGS.

Witnesses:
WM. A. MACLEOD,
JAMES H. CUTTEN.